United States Patent Office 3,817,818
Patented June 18, 1974

3,817,818
FABRIC
Harry Riding, Rawtenstall, William Brian Carlyle, Morecambe, and Edgar Morris, Gregory Fold, Helmshaw, England, assignors to The Rossendale Combining Company Limited, Newhallhey Shed, Rawtenstall, Lancashire, England
No Drawing. Filed June 19, 1972, Ser. No. 264,088
Claims priority, application Great Britain, June 17, 1971, 28,361/71
Int. Cl. B32b 3/26, 5/18
U.S. Cl. 161—89                    9 Claims

ABSTRACT OF THE DISCLOSURE

A composite textile fabric having waterproof properties comprises a layer of textile material bonded to one side of a layer of polyurethane foam, the other side of the foam layer being bonded to one side of a layer of polyurethane film material which is impermeable to water, the other side of the film layer being bonded to a second layer of polyurethane foam.

---

This invention relates to composite textile fabrics and has for its principal object to provide a composite fabric which will meet the normal requirements for a waterproof fabric.

The fabric according to the invention comprises a layer of textile material bonded to one side of a layer of polyurethane foam, the other side of the foam layer being bonded to one side of a layer of polyurethane film material which is impermeable to water, the other side of the film layer being bonded to a second layer of polyurethane foam.

If desired a further layer of textile material may be bonded to the exposed surface of the second foam layer, at least one of the textile layers comprising a knitted fabric or other non-woven material.

For some of the purposes for which the fabric according to the invention is likely to be used, including in particular the production of articles of clothing, it is desirable that the fabric should be resistant to dry-cleaning solvents and to washing, and should drape well and have a satisfactory handle. These properties can be obtained by using as synthetic film material a polyurethane film, such as those which are available commercially under the trademarks "Tuftane" and "Platilon UEF" which are strong, elastic, pliable and resistant to dry-cleaning solvents. A film of a thickness of 0.001 to 0.003 inch will usually be suitable.

The bonding of the film and the textile materials to the foam layers may be effected by known methods and apparatus, for example by means of a flame bonding process as is described in British Patent Specifications Nos. 888,367 and 888,368, or by means of suitable adhesives.

Suitable adhesives include:

(a) Isocyanate-based adhesives of the two-component type consisting of, for example, a hydroxyl terminated polyester or polyol or polyalcohol ether as one component, admixed before use with an isocyanate, polyisocyanate or "blocked" isocyanate as the other component.

(b) Prepolymer polyurethane systems containing free isocyanate groups; such systems may be cured in the presence of water and/or multi-functional polyols or multi-functional hydroxyl-containing tertiary amines, for example.

(c) Other urethane-urea systems resulting from the employment of an isocyanate, polyisocyanate or "blocked" isocyanate with water.

Of particular interest are two representatives of isocyanate-based adhesive systems. The first is a polyisocyanate, marketed by Bayer under the trade name Desmodur L, which may be applied e.g. as a solution in ethyl acetate to the film or foam component of the material of the invention with a view to effecting the final bonding and cure in the presence of water. To that end the fabric component may be suitably moistened or wetted with water whereupon, on being brought into intimate contact with the isocyanate-treated foam or film layer and maintained in contact for a period of a few minutes at elevated temperature, a bond of polyurea will be formed. Alternatively, dry fabric may be used but upon contacting with the film or foam pre-treated with the adhesive, steam may be applied to effect the cure and make the bond permanent.

The second system of particular interest is a modification of the one described above wherein, through suitable formulation, foaming can be caused to occur when moist fabric is contacted with the isocyanate layer, or when dry fabric is assembled with the other components and the assembly steamed.

Yet another way of producing an adhesive layer is to use a one-shot foaming system dispensed as a film on the base film prior to combination with the fabric.

Apart from isocyanate-based adhesives, other adhesive systems may be used with particular fabric/film combinations, for example, emulsion-based adhesives such as cross-linkable acrylics, or solvent-based adhesives such as, for example, rubber/resin combinations. In most cases it is advantageous to employ a curable system which, after suitable cross-linking is resistant to dry-cleaning solvents. Hot-melt adhesives may also be employed. A particularly convenient way of using such adhesives is to apply a layer of the adhesive to the film at one station and then combine with the fabric either during the "open time" of the adhesive or after suitable reactivation by heating, if necessary.

The textile material may be the same on both sides of the product, or different types or patterns of textile material may be used on the two sides. As long as one of the layers of textile material comprises a knitted or non-woven material, the other layer may if desired be a woven fabric.

A suitable type of non-woven material which may be used instead of a knitted fabric is a stitch-bonded web, which may consist of viscose, polyacrylonitrile or polyester fibres.

The polyurethane foam may be a polyester type foam, and may be used in thin layers, e.g. layers 1.75 mm. thick.

In some cases it is advantageous if some of the cellular structure of the foam is preserved with a view to creating some facility for circulation of air in the foam layers, and/or modifying some of the properties, (e.g. handle, drape) of the product.

The invention is illustrated by the following examples.

EXAMPLE 1

The materials used were:

1. Nylon tricot, a locknit fabric made from nylon 66, 30 denier, width 64", weight 1.5 to 2 oz.
2. Melton fabric, 54" wide, weight 25 oz, warp 42 ends per inch, weft 21 picks per inch, strength warp 280, weft 240, made from yarn containing 88% wool, 12% cotton.
3. Polyurethane foam, thickness 1.75 mm., polyester type.
4. "Tuftane" polyurethane film, thickness 0.001 inch.

The Melton cloth and the Tuftane film were simultaneously bonded, one on each side of a polyurethane foam layer, by flame bonding, giving a three-layer structure.

Then the film side of this structure was flame-bonded to another layer of foam, the nylon tricot fabric being simultaneously flame-bonded to the other side of this foam layer to produce the desired five-layer structure.

EXAMPLE 2

A composite fabric was made in the same way as in Example 1, except that the Melton fabric was replaced by a double jersey polyester fabric, 150/30 denier, width 62", weight 11 oz.

In each case, the composite fabric had excellent handle and drape properties and was suitable for making up into garments. The fabrics were suitable for washing and dry-cleaning. The adhesions between all the component layers met the requirements of BSS 4614, Part 1, Sections 9 and 10, and the dimensioned stabilities met the requirements of Section 11 of the same standard when tested by the methods set out in Sections 11.2 and 11.3.

The fabrics were waterproof and met the requirements set out in BSS 903, Part G5, Section 2.

EXAMPLE 3

Two laminates were prepared by flame-bonding, one consisting of a knitted nylon fabric bonded to a layer of polyurethane foam, the other side of which was bonded to a Tuftane film, and the other consisting of a layer of polyurethane foam bonded to a knitted nylon fabric.

An adhesive solution was prepared by mixing 100 parts by weight of Desmocoll 22 (a weakly branched polyester containing hydroxyl groups marketed by Bayer) with 40 parts of a 75% solution in ethyl acetate of Desmodur L (a low molecular weight polyurethane marketed by Bayer) and diluting with 620 parts of ethyl acetate. The solution was brushed on to the exposed surface of the Tuftane film of the first-mentioned laminate so that the weight of adhesive per unit area was from 1.6 to 6.7 mgm. per sq. cm. The laminate was left at room temperature for 10 minutes to allow a large part of the solvent to evaporate and then the exposed surface of the foam layer of the second mentioned laminate was applied to the adhesive coated film in a press, applying pressure such that only slight compression of the laminate took place, with a platen temperature of 140° C. A successful bond was obtained after 6 minutes and the complete product met the requirements of BSS 903 as regards its waterproof properties.

EXAMPLE 4

The procedure was the same as in Example 3, except that the adhesive used was a one-component isocyanate, Desmodur L diluted with an equal weight of ethyl acetate, used in an amount of 2.5 to 6.7 mgm. per sq. cm. The foam layer of the second laminate was lightly sprayed with water and applied to the adhesive-coated film after the latter had been allowed to dry for 5 minutes. After bonding under heat and pressure as in Example 3 the product met the requirements of BSS 903.

EXAMPLE 5

The adhesive used in this Example was water-based type. An aqueous emulsion of Texicryl 13-100 (a reactive acrylic copolymer marketed by Scott Bader Co. Ltd.) was mixed with melamine formaldehyde in the proportion of 20 parts by weight of emulsion to 3 parts by weight of melamine formaldehyde. The mixture was applied to the exposed film surface of a first laminate as described in Example 3, the weight of adhesive being from 0.77 to 4.0 mgm. per sq. cm. of film. The foam layer of a second laminate was applied immediately and bonding was effected under heat and pressure as in Example 3.

The final product met the requirements of BSS 903.

Satisfactory bonds can also be obtained if the adhesive is applied in a discontinuous rather than a continuous layer.

It has been found that the composite fabric of the present invention is particularly impermeable to hydrocarbons.

What is claimed is:

1. A composite fabric comprising a layer of textile material bonded to one side of a layer of polyurethane foam, the other side of the foam layer being bonded to one side of a layer of a polyurethane film material which is impermeable to water, the other side of the film layer being bonded to a second layer of polyurethane foam.

2. A fabric as claimed in claim 1, in which a further layer of textile material is bonded to the exposed surface of the second layer of polyurethane foam, at least one of the textile layers comprising a knitted fabric or other non-woven material.

3. A fabric as claimed in claim 1, in which the bonding of the fabric layer or layers and the film layer to the foam layers is effected by flame bonding.

4. A fabric as claimed in claim 1, in which the bonding of the fabric layer or layers and/or the film layer to the foam layers is effected by means of an adhesive.

5. A fabric as claimed in claim 1, in which bonding of the fabric layer or layers and of the film layer to the foam layers is effected in part by flame bonding and in part by means of adhesives.

6. A fabric as claimed in claim 1, in which the foam layers are bonded to an inner layer of linear polyurethane film 0.001–0.003 inch thick.

7. A fabric as claimed in claim 2, in which the outer fabric layers are knitted nylon fabrics.

8. A fabric as claimed in claim 2, in which one of the outer fabric layers is a knitted fabric while the other outer fabric layer is a woven fabric.

9. A fabric as claimed in claim 2, in which at least one of the outer fabric layers consists of a stitch-bonded web.

References Cited

UNITED STATES PATENTS

| | | | |
|---|---|---|---|
| 2,999,041 | 9/1961 | Lappala | 161—160 |
| 3,228,820 | 1/1966 | Samson | 156—307 |
| 3,446,685 | 5/1969 | Goldstone et al. | 161—160 |

FOREIGN PATENTS

| | | | |
|---|---|---|---|
| 1,362,035 | 4/1964 | France | 161—160 |

WILLIAM J. VAN BALEN, Primary Examiner

U.S. Cl. X.R.

161—92, 160, 165, 190